United States Patent
Brini et al.

(10) Patent No.: US 11,798,023 B2
(45) Date of Patent: *Oct. 24, 2023

(54) SYSTEMS AND METHODS TO DETERMINE TAX CLASSIFICATION OF BENEFITS OFFERED TO SUBSCRIBERS OF A MEMBERSHIP PLATFORM

(71) Applicant: Patreon, Inc., San Francisco, CA (US)

(72) Inventors: Yacine Brini, San Francisco, CA (US); Priya Sanger, San Francisco, CA (US)

(73) Assignee: Patreon, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,306

(22) Filed: Feb. 7, 2022

(65) Prior Publication Data

US 2022/0156781 A1 May 19, 2022

Related U.S. Application Data

(63) Continuation of application No. 16/801,511, filed on Feb. 26, 2020, now Pat. No. 11,270,330.

(51) Int. Cl.
*G06Q 30/0207* (2023.01)
*G06N 3/08* (2023.01)
(Continued)

(52) U.S. Cl.
CPC ........... *G06Q 30/0236* (2013.01); *G06N 3/08* (2013.01); *G06N 20/00* (2019.01); *G06Q 40/10* (2013.01)

(58) Field of Classification Search
CPC .... G06Q 30/0236; G06Q 40/10; G06N 20/00; G06N 3/08
See application file for complete search history.

(56) References Cited

U.S. PATENT DOCUMENTS 7,921,028 B2 4/2011 Cole
8,051,040 B2 11/2011 Johnson
(Continued)

FOREIGN PATENT DOCUMENTS

JP 2019191623 A 10/2019
WO 2009045899 A2 4/2009

OTHER PUBLICATIONS

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

(Continued)

*Primary Examiner* — Ilana L Spar
*Assistant Examiner* — Allan J Woodworth, II
(74) *Attorney, Agent, or Firm* — ESPLIN & ASSOCIATES, PC

(57) ABSTRACT

Systems and methods are provided for determining tax classification of benefits offered to subscribers of a membership platform. Exemplary implementations may: obtain benefit information for content creators of a membership platform, the benefit information including descriptions of benefit items offered by the content creators to subscribers of the membership platform in exchange for consideration; obtain classification information, the classification information associating benefit type of individual benefit items with individual tax classifications; classify the individual benefit items with the individual tax classifications based on the benefit type of the individual benefit items and the classification information; execute transactions for accepted ones of the offerings based on the individual tax classifications of the individual benefit items, wherein the transactions are based on transaction amounts comprising sale amounts and added tax amounts determined based on the individual tax classifications; and/or other operations.

18 Claims, 4 Drawing Sheets

(51) Int. Cl.
  *G06N 20/00* (2019.01)
  *G06Q 40/10* (2023.01)

(56) References Cited

U.S. PATENT DOCUMENTS

| | | | |
|---|---|---|---|
| 8,375,024 | B2 | 2/2013 | Goeldi |
| 8,850,490 | B1 | 9/2014 | Thomas |
| 9,035,163 | B1 | 5/2015 | Mohajer |
| 9,060,249 | B2 | 6/2015 | Meredith |
| 9,558,277 | B2 | 1/2017 | Pappas |
| 9,734,521 | B2 | 8/2017 | Curtis |
| 9,767,208 | B1 | 9/2017 | Chow |
| 9,870,581 | B1 | 1/2018 | Vormweg |
| 10,356,574 | B1 | 7/2019 | Wood |
| 10,607,242 | B1 | 3/2020 | Wood |
| 10,621,532 | B1 | 4/2020 | Conte |
| 10,936,986 | B2 | 3/2021 | Conte |
| 10,937,042 | B2 | 3/2021 | Wood |
| 11,049,191 | B1* | 6/2021 | Wilczek .......... G06Q 40/123 |
| 11,238,542 | B1* | 2/2022 | Wixted ........... G06Q 30/0633 |
| 11,270,330 | B1 | 3/2022 | Brini |
| 2002/0036654 | A1 | 3/2002 | Evans |
| 2002/0103698 | A1 | 8/2002 | Cantrell |
| 2007/0038516 | A1 | 2/2007 | Apple |
| 2007/0069013 | A1* | 3/2007 | Seifert .................. G07G 1/12 |
| | | | 235/383 |
| 2007/0164554 | A1 | 7/2007 | Krone |
| 2008/0120185 | A1 | 5/2008 | Evans |
| 2008/0183577 | A1 | 7/2008 | Evans |
| 2008/0215467 | A1 | 9/2008 | Huffman |
| 2008/0265020 | A1* | 10/2008 | Copeland ............ G06Q 20/12 |
| | | | 235/380 |
| 2009/0069911 | A1 | 3/2009 | Stefik |
| 2009/0158318 | A1 | 6/2009 | Levy |
| 2009/0234710 | A1 | 9/2009 | Belgaied Hassine |
| 2011/0258049 | A1 | 10/2011 | Ramer |
| 2011/0295722 | A1 | 12/2011 | Reisman |
| 2012/0054666 | A1 | 3/2012 | Baird-Smith |
| 2012/0179556 | A1 | 7/2012 | Ertas |
| 2012/0190386 | A1 | 7/2012 | Anderson |
| 2012/0272278 | A1 | 10/2012 | Bedi |
| 2012/0278725 | A1 | 11/2012 | Gordon |
| 2012/0311462 | A1 | 12/2012 | Devecka |
| 2013/0080328 | A1 | 3/2013 | Royyuru |
| 2013/0197979 | A1 | 8/2013 | Han |
| 2013/0226691 | A1 | 8/2013 | Chatow |
| 2013/0275429 | A1 | 10/2013 | York |
| 2014/0025473 | A1 | 1/2014 | Cohen |
| 2014/0032326 | A1 | 1/2014 | Li |
| 2014/0067554 | A1 | 3/2014 | Heppding |
| 2014/0067702 | A1 | 3/2014 | Rathod |
| 2014/0122507 | A1 | 5/2014 | Zeng |
| 2014/0164049 | A1 | 6/2014 | Yakos |
| 2014/0164514 | A1 | 6/2014 | Eteminan |
| 2014/0214641 | A1* | 7/2014 | Acker, Jr. ............ G06Q 40/00 |
| | | | 705/35 |
| 2014/0280121 | A1 | 9/2014 | Sharp |
| 2014/0324604 | A1 | 10/2014 | Munoz Torres |
| 2014/0366047 | A1 | 12/2014 | Thomas |
| 2015/0066189 | A1 | 3/2015 | Mulligan |
| 2015/0066675 | A1 | 3/2015 | Camelio |
| 2015/0161692 | A1 | 6/2015 | Tembo |
| 2015/0193889 | A1 | 7/2015 | Garg |
| 2015/0363899 | A1 | 12/2015 | Krause |
| 2016/0071058 | A1 | 3/2016 | Galuten |
| 2016/0080485 | A1 | 3/2016 | Hamedi |
| 2016/0124918 | A1 | 5/2016 | Ying |
| 2016/0189198 | A1 | 6/2016 | McKenzie |
| 2016/0210650 | A1 | 7/2016 | Sewell |
| 2016/0232480 | A1 | 8/2016 | Erez |
| 2016/0239807 | A1* | 8/2016 | Creighton .......... G06Q 10/1057 |
| 2016/0357376 | A1 | 12/2016 | Carrigan |
| 2017/0076348 | A1* | 3/2017 | Jennings ............ G06Q 30/0621 |
| 2017/0083930 | A1* | 3/2017 | Nagaraj ............. G06Q 30/0207 |
| 2017/0161794 | A1 | 6/2017 | Zhu |
| 2017/0337621 | A1 | 11/2017 | Peters |
| 2018/0040019 | A1 | 2/2018 | Gavlovski |
| 2018/0075147 | A1 | 3/2018 | Bagheri |
| 2018/0121973 | A1 | 5/2018 | Dimascio |
| 2018/0144052 | A1 | 5/2018 | Sayyadi-Harikandehei |
| 2018/0365709 | A1 | 12/2018 | Modani |
| 2019/0026280 | A1 | 1/2019 | Aviyam |
| 2019/0026782 | A1 | 1/2019 | McGrath |
| 2019/0164082 | A1 | 5/2019 | Wu |
| 2019/0290965 | A1* | 9/2019 | Oren ..................... G16H 20/30 |
| 2019/0361577 | A1 | 11/2019 | Burns |
| 2020/0007934 | A1 | 1/2020 | Ortiz |
| 2020/0020014 | A1 | 1/2020 | Jin |
| 2020/0089724 | A1 | 3/2020 | Zimovnov |
| 2020/0134696 | A1 | 4/2020 | Lardeux |
| 2020/0219025 | A1 | 7/2020 | Conte |
| 2020/0219114 | A1 | 7/2020 | Wood |
| 2020/0300538 | A1* | 9/2020 | Avakian ............. G06Q 10/087 |
| 2020/0311751 | A1* | 10/2020 | Shi .................... G06Q 30/0201 |
| 2020/0320571 | A1 | 10/2020 | Singh |
| 2021/0133651 | A1 | 5/2021 | Conte |
| 2021/0133775 | A1 | 5/2021 | Wood |
| 2021/0158317 | A1 | 5/2021 | Kurylko |
| 2021/0192460 | A1 | 6/2021 | Xu |
| 2022/0277356 | A1 | 9/2022 | Russo |
| 2022/0318704 | A1 | 10/2022 | Brini |
| 2022/0377399 | A1 | 11/2022 | Bonner |
| 2023/0153840 | A1 | 5/2023 | Wood |
| 2023/0162118 | A1 | 5/2023 | Conte |
| 2023/0206154 | A1 | 6/2023 | Brini |

OTHER PUBLICATIONS

Gerri Detweiler, Reward Crowdfunding, Mar. 20, 2020, Nav, 11 pages, https://www.nav.com/business-financing-options reward-crowdfunding/ (Year: 2020).

Investing in Games With Fig Game Shares,Feb. 28, 2019, fig.co, 12 pages, https://www.fig.co/invest#rewards-based-crowdfunding (Year: 2019).

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).

Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 15-18, 2009 (Year: 2009).

Massimiliano Barbi and Marco Bigelli, Crowdfunding practices in and outside the US, Jun. 2017, 47 pages, ResearchGate DOI: 10.1016/ j.ribaf.2017.05.013 (Year: 2017).

Wilson et al., Real World Applications of Machine Learning Techniques over Large Mobile Subscriber Datasets, SE4ML: Software Engineering for Machine Learning , 9 pages, ARXIV ID: 1502. 02215 Publication Date: Feb. 8, 2015 (Year: 2015).

Mattison, David, "Reality Check for your Muses: Creativity and Business Innovation Resources", Searcher; Medford vol. 16, Iss. 10, (Nov./Dec. 2008): 16-21, 55-59. (Year: 2008).

Ondrejka, Cory, "Escaping the gilded cage: User created content and building the metaverse", 49 N.Y.L. Sch. L. Rev. 81 (2004). (Year: 2004) (23 pages).

Vanderhoef, II, Robert John, et al., "An Industry of Indies: The New Cultural Economy of Digital Game Production", University of California, Santa Barbara, Sep. 2016, pp. 1-259. (Year: 2016).

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

Harris, William. "26 Inexpensive Customer Delight Ideas Worth Trying to Fuel Business Growth" Sellbrite, Jun. 2016, https://ww.sellbrite.com/blog/customer-delight/(Year: 2016).

Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016).

(56) References Cited

OTHER PUBLICATIONS

Miller, Nicole. "Inside Buffer's Community Delight Headquarters: How and Why We Send Swag and What It All Costs" Buffer, Apr. 27, 2015, https://buffer.com/resources/community-delight/ (Year: 2015).

Shipwire. "Marketing inserts" Shipwire support, Feb. 27, 2015, https://www.shipwire.com/w/support/marketing-inserts/ (Year: 2015).

Yarbro, Printify Vs. Printful: Pros and Cons, Dec. 9, 2019, nomadicwander, https://nomadicwander.com/2019/12/09. printify-vs-printful-pros-and-cons/ (Year:2019).

Iulia, "9 social media apps paying their content creators", May 16, 2021 (Year: 2021) 4 pages.

Perez, "Watchworthy's personalized TV recommendation app will help you find your next binge", Mar. 24, 2020 (Year: 2020) 4 pages.

Author(s):Osuala Title: Impact of subscription based crowdfunding on creators online channels Journal: ERF [online]. Publication date: 2019.[retrieved on: Feb. 23, 2023 ]. Retrieved from the Internet: < URL: https://aisel.aisnet.org/cgi/viewcontent.cgi?article=1017& context=amcis2019> (Year: 2019).

Content and conduit: Relative profitability in the new era of television Todreas, Timothy Michael. ProQuest Dissertations and Theses, ProQuest Dissertations Publishing. (1996) (Year: 1996) 431 pages.

\* cited by examiner

SYSTEMS AND METHODS TO DETERMINE TAX CLASSIFICATION OF BENEFITS OFFERED TO SUBSCRIBERS OF A MEMBERSHIP PLATFORM

FIELD

The disclosure relates to systems and methods to determine tax classification of benefits offered to subscribers of a membership platform.

BACKGROUND

Different membership platforms may be utilized by entities seeking contributions from users to obtain services and/or goods. Some of these platforms facilitate raising resources (i.e., funds) through monetary contributions or donations to support a project. Oftentimes, supporters of a project are given rewards or special perks, where the size and/or exclusivity of the rewards or special perks may depend on the amount contributed.

The services and/or goods being offered through one or more platforms are subject to tax. The type of service and/or good generally dictates what type or amount of tax is applied to the purchase price. For example, physical goods may be subject to different tax than digital goods.

SUMMARY

One or more aspects of the present disclosure addresses issues arising in the application of tax to the consideration paid in exchange for benefit items offered through an online membership platform. Some issues may arise in membership platforms that process thousands of transactions (or more) for benefit items by subscribers at any given period of time. A common solution may be to apply a "standard" tax rate to total amounts of the consideration paid. However, this may result in the tax amount being below or above the actual tax obligation. This is because the tax applied to a purchase will vary depending on the type of good and/or the state of production that the good is in and/or based on the jurisdiction of the consumer. These types of tax calculations may be based on what is referred to as "value added tax" (VAT). For example, consumers living in a given jurisdiction may be obligated to pay a value added tax (VAT) on digital goods at the rate that applies in their own jurisdiction, regardless where the seller is located. A value added tax (VAT) may also be a consumption tax placed on a good or service when value is added at each stage of the supply chain, from production to the point of sale. The amount of VAT that the consumer pays is on the cost of the good and/or service, less any of the costs of materials used in the good and/or service that have already been taxed. The system may utilize one or more machine learning models to structure the benefit items into discrete units and classify individual benefit items based on tax classification. The system may facilitate the execution of transactions by applying the appropriate tax amounts to the final purchase price and/or remitting the collected tax amounts to the appropriate jurisdictions.

A membership platform may be comprised of users including one or more of content creators, subscribers, and/or other users. Content creators may be users of the membership platform who offer benefit items to subscribers in exchange for some consideration. A "benefit item" may refer to a good and/or service. A good may comprise a physical good and/or a virtual good. In some implementations, subscribers may donate funds to a content creator such that the benefit item may be the altruism in supporting the content creator. Subscribers may be users of the membership platform who subscribe, through payment of a one-time or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

One or more aspects of the present disclosure relates to a system configured to determine tax classification of benefits offered to subscribers of a membership platform. The system may include one or more hardware processors configured by machine-readable instructions. The machine-readable instruction may include one or more computer program components. The one or more computer program components may include one or more of a benefit management component, a classification component, a transaction component, a presentation component, and/or other computer components.

The benefit management component may be configured to obtain benefit information for content creators of a membership platform and/or other information. The benefit information may include descriptions of benefit items offered by the content creators to subscribers of the membership platform in exchange for consideration and/or other information. The benefit information may describe the benefit items in an unstructured data format. An unstructured data format may refer to a text-based description proffered by the content creators. The text-based description may be generated by the content creators in their own words, which may comprise jargon and/or a lexicon specific to the content creator.

The classification component may be configured to obtain classification information and/or other information. The classification information may associate a benefit type of individual benefit items with individual tax classifications. An individual benefit type may include one or more of an original digital good type, a physical good type, a donation type, and/or other types. The classification component may be configured to classify the individual benefit items with the individual tax classifications based on one or more of the benefit type of the individual benefit items, the classification information, and/or other information.

The transaction component may be configured to execute transactions for accepted ones of the offerings based on the individual tax classifications of the individual benefit items and/or other information. The transactions may be based on transaction amounts comprising one or more of sale amounts, added tax amounts, and/or other amounts. The added tax amounts may be determined based on the individual tax classifications and/or other information.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

One or more aspects of the present disclosure provide improvements in the processing of thousands, to tens of thousands or more, of online transactions for benefit items offered through an online membership platform. The present disclosure proposing utilizing one or more machine learning models to structure the benefit items into discrete units and classify individual benefit items based on tax classification. The present disclosure may facilitate the execution of transactions by applying the appropriate tax amounts to the final purchase price and/or remitting the collected tax amounts to the appropriate jurisdictions. The present disclosure may ensure that the tax amounts are correct so that an entity utilizing the features and/or functions presented herein may not remit tax amounts below or above the actual tax obligation.

Some entities may seek to obtain funds through subscriptions. Such entities may utilize online membership platforms that allow consumers to sign up for ongoing payments in exchange for rewards or other membership benefits. Entities seeking funding may be content creators, for example, artists, musicians, educators, etc. Content creators may create content in the form of benefit items, which may refer to information, experiences, and/or products provided to an audience or end-user, whether it be digital or physical. For example, content may include but is not limited to video content, podcasts, photographic art, webcomics, do-it-yourself crafts, digital music, performance art, and/or other types of content. Content creators may utilize membership platforms that allow users to become subscribers of the content creator. As subscribers, consumers may contribute or donate money to a content creator on a recurring (e.g., weekly or monthly) basis and/or per piece of content created by the content creator. Content creators may interact with subscribers and/or prospective subscribers (e.g., consumers that show interest in the content created by content creators) in a variety of ways. Herein the term "benefit item" may refer to an individual unit of content being offered by the content creator.

Figure 1:
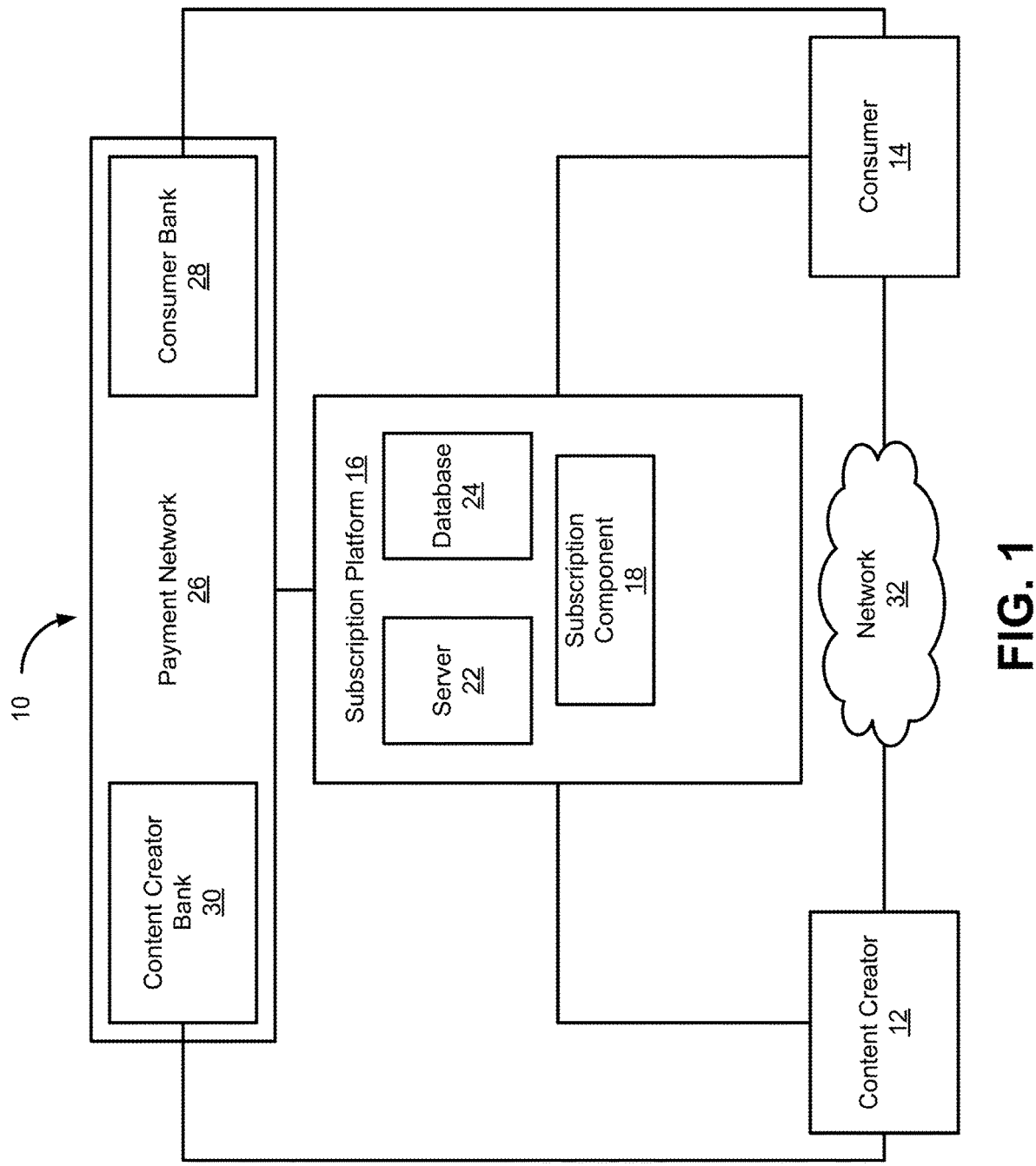
FIG. 1 illustrates an example membership platform.

FIG. 1 illustrates an example subscriber-based membership system 10 (sometime referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, information specifying desired and/or initial subscription levels, preferred revenue source information (e.g., preferred currency, currency source, and/or other information), identification information (e.g., identification of applicable tax jurisdiction and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as "subscriber") may set up a subscriber account with subscription platform 16. In setting up the subscriber account, consumer 14 may input demographic information relevant to consumer 14 (e.g., age, income, job, etc.). Information identifying consumer 14 (e.g., name, a picture, a phone number, etc.) may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may add subscribership information, update and/or delete existing subscribership information, add creation information, as well as update and/or delete creation information, add, update, and/or delete preferential access information and/or its correspondence to subscription levels, etc. Such changes may be input via subscription component 18 and reflected in its local memory and/or database 24. It should be understood that content creator 12 and/or consumer 14 may be an individual or some entity representative of an individual or group of individuals.

Apart from providing preferential access to consumer 14, content creator may engage with consumer 14 by interacting in a variety of ways. For example, content creator 12 may communicate with consumer 14 over email, one or more social media platforms, a messaging platform or other appropriate communication mechanism or method. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's webpage in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber. It should be noted that a content creator's subscribers may be collectively referred to as the content creator's community.

Figure 2:
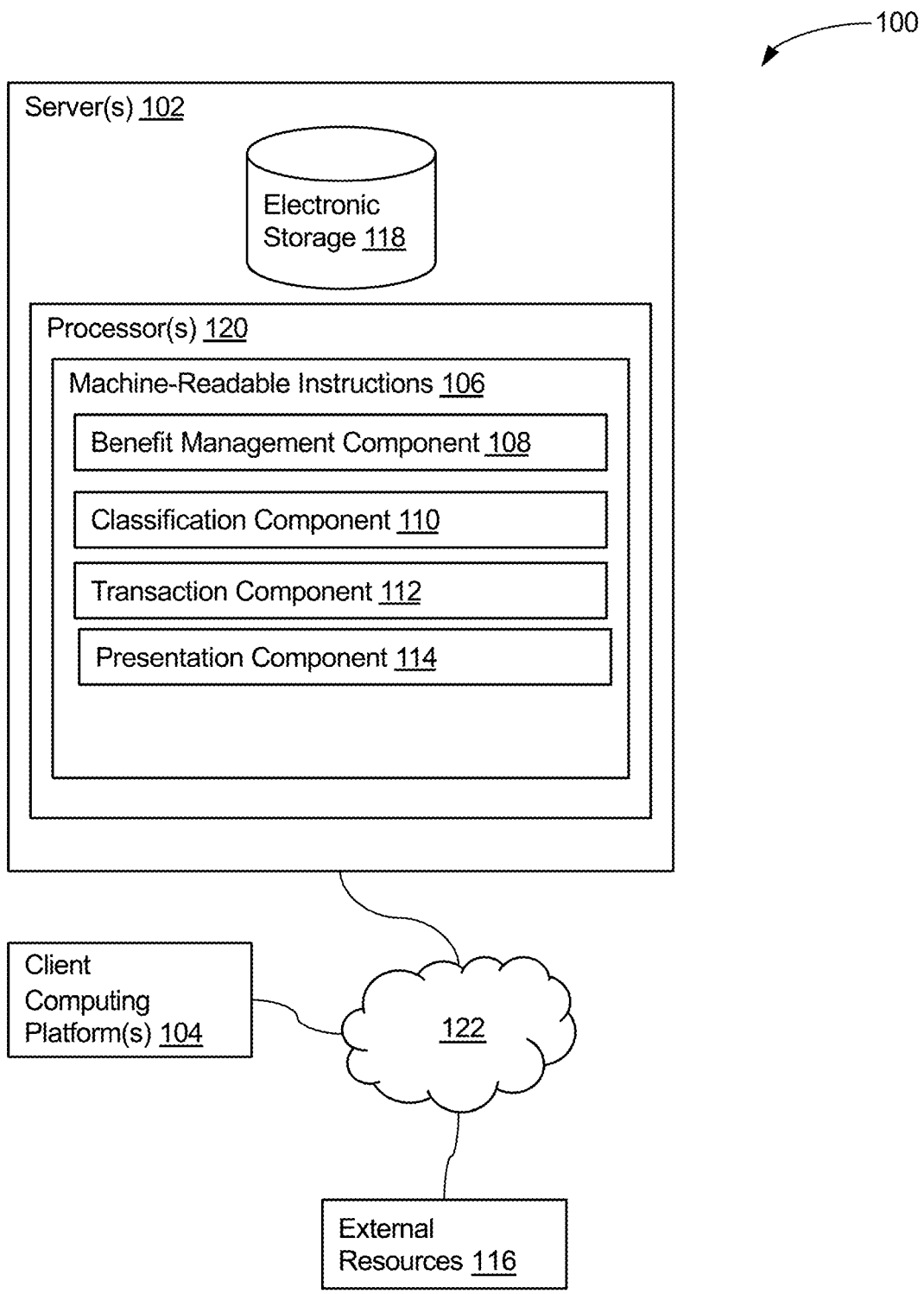
FIG. 2 illustrates a system configured to determine tax classification of benefits offered to subscribers of a membership platform, in accordance with one or more implementations.

FIG. 2 illustrates a system 100 configured to determine tax classification of benefits offered to subscribers of a membership platform. In some implementations, system 100 may include one or more of server(s) 102, client computing platform(s) 104, and/or other components. Server(s) 102 may be configured to communicate with one or more client computing platforms 104 according to a client/server architecture and/or other architectures via one or more network(s) 122. The terms client computing platform, remote computing platform, and/or computing platform may be used interchangeably herein to refer to individual ones of the client computing platform(s) 104. In some implementations, one or more network(s) 122 may include the Internet and/or other networks. Client computing platform(s) 104 may be configured to communicate with other client computing platforms via server(s) 102 and/or according to a peer-topeer architecture, a client-server architecture, and/or other architectures. Users may access system 100 via client computing platform(s) 104.

It is noted that the system 100 of FIG. 2 may be the same as, or included as part of, the system 10 shown in FIG. 1. For example, the server(s) 102 may be the same as or included in servers 22. Network(s) 122 may be the same as or included in network 32. Individual client computing platforms of one or more client computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more instruction components. The instruction components may include computer program components. The instruction components may include one or more of a benefit management component 108, a classification component 110, a transaction component 112, presentation component 114, and/or other instruction components.

Benefit management component 108 may be configured to obtain benefit information for content creators of a membership platform, and/or other information. The benefit information may include descriptions of benefit items offered by the content creators to subscribers of the membership platform in exchange for consideration. In some implementations, the benefit information may describe a first set of benefit items offered by a first content creator and/or other benefit items offered by one or more other content creators.

In some implementations, benefit management component 108 may be configured to identify the benefit items from the benefit information using an unsupervised machine learning model, input by creators into a user interface (see, e.g., presentation component 114), and/or other techniques. The benefit information may describe the benefit items in an unstructured data format. An unstructured data format may refer to a text-based description proffered by the content creators. The text-based description may be generated by the content creators in their own words, which may comprise jargon and/or a lexicon specific to the content creator. For example, in setting up their account, a content creator may simply type out sentences describing their offered benefit items in plain language. This may result in multiple benefit items being described jointly and/or in a commingled fashion such that the individual benefit items as individual units may not be readily ascertained. By way of non-limiting illustration, the benefit management component 108 may be configured to identify that the first set of benefit items includes one or more of a first benefit item, a second benefit item, and/or other benefit items.

By way of non-limiting illustration, a description of benefit items by an artist may include "You will receive a high-resolution digital image of the artwork and a time-lapse video of me creating it!" Accordingly, while it may appear that the benefit item comprises "a high-resolution digital image" and "a time-lapse video," there may actually be two unique benefit items, e.g., a first benefit item being "a high-resolution digital image" and a second benefit item being "a time-lapse video."

In some implementations, unsupervised machine learning may comprise a self-organized learning algorithm. The unsupervised machine learning model may utilize one or more clustering, anomaly detection, neural network, expectation-maximization algorithm, statistical approaches, blind signal separation techniques, and/or other techniques.

Classification component 110 may be configured to determine the benefit type of the individual benefit items. An individual benefit type includes one or more of an original digital good type, a physical good type, a donation type, and/or other type. An original digital good type may include digital and/or virtual goods originally created by the content creator. A physical good type may include a tangible real-world item. A physical good type benefit item may be further classified as original sub-type or resale sub-type. Original sub-type may refer to tangible real-world items originally generated, compiled, and/or otherwise created by the content creator. A resale subtype may refer to tangible real-world items which were acquired (but not created) by the content creator for resale through membership platform. A donation type may include consideration paid in exchange for the altruism in supporting the content creator in their endeavors.

Classification component 110 may be configured to obtain classification information and/or other information. The classification information may associate benefit type of individual benefit items with individual tax classifications. An individual tax classification may specify one or more of a tax amount to be applied. The tax amount may comprise a flat amount, a percentage of a sale amount, and/or other specification. In some implementations, the tax classifications may be specific to individual jurisdictions of the consumer and/or content creator. By way of non-limiting illustration, the classification information may associate a first benefit type with a first tax classification, a second benefit type with a second tax classification, and/or other benefit types with other tax classifications.

Classification component 110 may be configured to classify the individual benefit items with the individual tax classifications based on one or more of the benefit type of the individual benefit items, the classification information, and/or other information. The individual benefit items may be classified with the individual tax classification with which the benefit type of the individual benefit items correspond. By way of non-limiting illustration, by virtue of the first benefit item being the first benefit type, the first benefit item may be classified in the first tax classification. Furthermore, by virtue of the second benefit item being the second benefit type, the second benefit item may be classified in the second tax classification.

In some implementations, the classification component 110 may be configured to determine benefit type of individual benefit items and/or classify the individual benefit items with the individual tax classifications using a supervised machine learning model and/or other techniques. The classification component 110 may be configured to train the machine learning model based on input/output pairs. A given pair may include an input and an output. An input may include a description of an individual benefit item and/or a benefit type of the individual benefit item. An output may include a corresponding benefit type and/or a corresponding tax classification. The description of the individual benefit item provided as the input may include a description derived directly from the benefit information and/or a description determined from the identification of the individual benefit item from the benefit information (e.g., by benefit management component 108).

In some implementations, the classification component 110 may be configured to determine benefit type based on entry and/or selection of the benefit type of the individual benefit items by the individual content creators into a user interface (see, e.g., presentation component 114).

Transaction component 112 may be configured to execute transactions for accepted ones of the offerings based on one or more of sale amounts of individual benefit items, individual tax classifications of the individual benefit items, and/or other information. The transactions may comprise transaction amounts. Transaction amounts may comprise one or more of the sale amounts, added tax amounts, and/or other amounts (e.g., service fees, convenience fees, etc.). The added tax amounts may be determined based on the individual tax classifications and/or other information.

In some implementations, transaction component 112 may be configured to obtain purchase information conveying the acceptance of the offerings of the benefit items by the subscribers. For benefit items offered on a per item basis, acceptance may be conveyed when a subscribers indicates acceptance through a user interface (see, e.g., presentation component 114). For benefit items which are provided to subscribers who pay on a recurring basis, acceptance may be conveyed automatically as long as the recurring subscription is active.

The purchase information may specify the sale amounts of the individual benefit items and/or other information. The sale amounts may refer to one or more of the per benefit item price (e.g., the sale amount of the benefit item is specified), the recurring fee, a portion of the recurring fee, and/or other amounts. The recurring fee may comprise the sale amount in the event that the subscriber is provided the benefit item within the recurring fee period. The portion of the recurring fee applied to a given benefit item may be proportional to the quantity of benefit items offered during the recurring fee period. By way of non-limiting illustration, for a content creator who offers a given quantity of benefit items per recurring fee period, the portion of the recurring fee applied to a given benefit item may comprise the recurring fee divided by the given quantity of benefit items and/or other calculation. By way of non-limiting illustration, for a content creator who offers five benefit items per month while charging $10 for the month, the sale amount for each benefit item may comprise $2 ($10 divided by 5 benefit items). In some implementations, one or more benefit items in a set of benefit items offered over a recurring fee period may be weighted more in a per item amount calculation than other benefit items. The portion of the recurring fee applied to a given benefit item may be determined in other ways.

Transaction component 112 may be configured to determine the added tax amounts based on the sale amounts, the individual tax classifications, and/or other information. By way of non-limiting illustration, the added tax amounts may comprise percentages of the sale amounts or fixed amounts.

In some implementations, presentation component 114 may be configured to effectuate presentation of a user interface on computing platform(s) 104 of the subscribers. The user interface may display the transaction amounts to the subscribers. The user interface may be configured to obtain entry and/or selection of acceptance of the transaction amounts. In some implementations, for subscribers who pay on a recurring basis, acceptance of the transaction amounts may be conveyed automatically as long as the recurring subscription is active In some implementations, executing the transactions may include collecting the transaction amounts from consumer banks of the subscribers (see, e.g., consumer bank 28 in FIG. 1). In some implementations, executing the transactions may include remitting the added tax amounts to an appropriate tax collection entity (e.g., the appropriate jurisdiction). The collecting and/or remitting may be responsive to obtaining the entry and/or selection of the acceptance of the transaction amounts.

By way of non-limiting illustration, a first transaction for the first benefit item, a second transaction for the second benefit item, and/or other transactions may be executed. The first transaction may be for a first transaction amount. The first transaction amount may comprise one or more of a first sale amount of the first benefit item, a first tax amount determined based on the first tax classification, and/or other added amounts. The second transaction may be for a second transaction amount. The second transaction amount may comprise one or more of a second sale amount for the second benefit item, a second tax amount determined based on the second tax classification, and/or other added amounts.

In some implementations, presentation component 114 may be configured to effectuate presentation of the user interface on computing platform(s) 104 of the content creators. The user interface may be configured to obtain entry and/or selection of identification of individual benefit items from the benefit items, individual benefit type of the individual benefit items, and/or other information. In some implementations, the obtained entry and/or selection of identification of individual benefit items may be described by the benefit information. This may provide a way for content creators to particularly specify individual benefit items from otherwise unstructured text-based input describing benefit items. In some implementations, entry and/or selection of a benefit item may be based on one or more of entry into a text-input field, selection of a benefit item from a drop-down menu, selection of individual check boxes for individual benefit items, and/or other entry and/or selection. In some implementations, entry and/or selection of benefit type may be based on one or more of entry into a text-input field, selection of benefit type from a drop-down menu, selection of individual check boxes for individual benefit types, and/or other entry and/or selection.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. External entities participating with system 100 may include tax collection entities and/or intermediaries associated therewith. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 2 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 3:
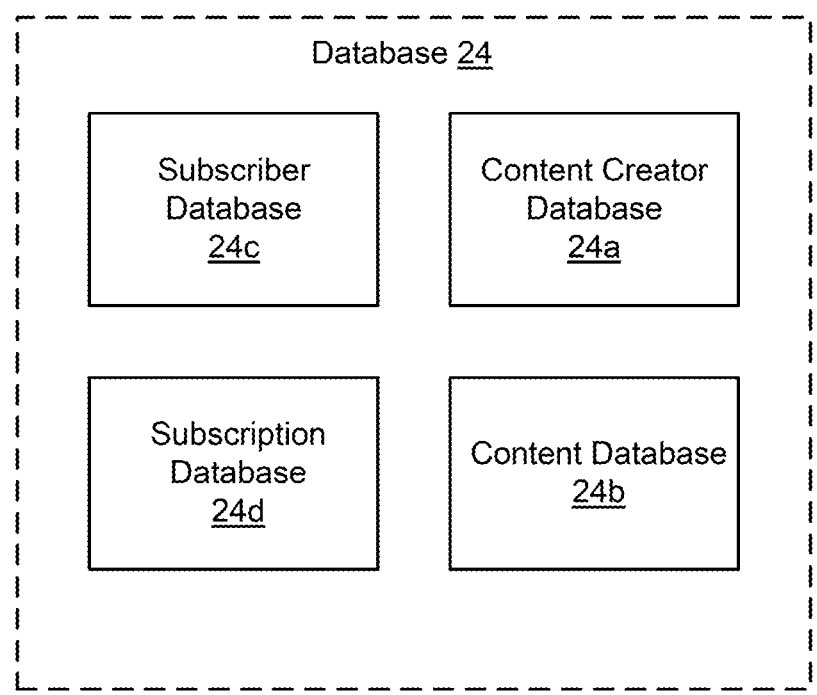
FIG. 3 illustrates an example database.

FIG. 3 illustrates elements that may make up database 24. As indicated previously, subscription component 18 of FIG. 1 may transmit information input by content creator 12 and/or consumer 14 regarding creation and/or subscribership information to database 24. Subscription platform 16, via server 22, for example, may monitor and obtain creation and/or subscribership information for storage in database 24. For example, subscription platform 16 may monitor and store additional content creator and/or subscriber demographic information as well as performance-related subscribership information, e.g., engagement activity between content creator 12 and his/her subscribers, one of whom may be consumer 14. For example, subscription platform 16 may monitor the amount of money being generated and/or lost through the subscribers, as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with creation data and/or subscription level information monitored or obtained from and/or associated with existing content creator and/or subscriber accounts established in subscription platform 16. Creation data may refer to information that characterizes one or more of content creator 12, the content that content creator 12 creates, and activity engaged in by content creator 12 to interact with one or more subscribers and/or to which consumer 14 is granted preferential access.

Content creator information characterizing content creator 12 may be information reflecting the type of creator that content creator 12 designates him/herself to be and/or any preferences regarding subscription offerings by content creator 12. For example, content creator type information may reflect that content creator 12 may be a paint artist, a digital artist, a sculptor, a video game developer, a writer, a performance artist, etc. Content creator preference information may reflect subscription levels content creator 12 wishes to offer to subscribers. Content creator preference information may reflect, e.g., a desired minimum revenue, preferred sources of revenue, subscription level proportions, benefit item weights, and/or other information. For example, content creator preference information may include information indicating content creator 12's desire for more subscribers pledging some amount of money or less subscribers pledging a greater amount of money. For example, content creator preference information may include information specifying that content creator 12 wishes to supplement his/her subscription-generated revenue with revenue generated from the sale of promotional merchandise. Such information may be stored in a content creator database 24a.

In addition to content creation-related information, and upon registering with subscription platform 16 as a content creator, content creator 12 may input information characterizing the identity of content creator 12. For example, content creator 12 may input or upload contact information, a telephone number associated with a personal user device (such as a smartphone), an email address, a photograph, jurisdiction, and/or other identifying information. Such identifying information may be used by subscription platform 16 in a variety of ways to associate content creator 12 with particular content, his/her webpage, payment of subscription donations, and/or other information.

Content information characterizing the content that content creator 12 creates may refer to one or more of the type of content created, the medium in which the content is created and/or presented, the amount of content created, and/or the frequency at which the content is created. For example, type of content information and/or content medium information may indicate that content creator 12 creates paintings on canvas, develops video games for a mobile platform, performs in online musical performances, and/or other information. For example, content amount information may reflect that content creator 12 created a series of artwork comprising four paintings. For example, content frequency information may indicate that content creator 12 developed three video games over the course of six months. Such information may be stored in content database 24b.

Consumer 14 may subscribe to content creator 12 by registering with subscription platform 16. During registration, consumer 14 may input certain subscriber demographic information indicative of economic and/or social characteristics of consumer 14, jurisdiction of the consumer 14, and/or other information. Subscriber demographic information may reflect the yearly income of consumer 14, a geographic area in which consumer 14 resides, the age of consumer 14, interests of consumer 14, etc. Subscriber information may include data regarding the amount of money consumer 14 is currently pledged to donate to one or more content creators. Over time, as monitored and collected by subscription platform 16, subscriber information may include information regarding the amount of money consumer 14 has previously donated to one or more content creators, including content creator 12. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creator 12, consumer 14 may input or upload other identifying information that may be used by subscription platform 16 in a variety of ways to associate consumer 14 with particular content, a particular content creator, payment of subscription donations, etc. For example, a photograph or phone number of consumer 14 may be used, e.g., as a mechanism for correlating consumer 14's attendance at a live event with consumer 14's status as a subscriber of content creator 12, another content creator present at the live event, a subscriber of content similar to that being presented at the live event, etc. Such information may be stored in subscriber database 24c. Subscriber component 18 or another component may be used to provide a user interface that may be used by consumer 14 to input such information.

Subscription level information may refer to information characterizing different subscription levels and corresponding preferential access information specified by content creator 12. For example, subscription level information may reflect that a ten dollar recurring donation is rewarded with a high-resolution digital image of artwork created during that month to consumer 14. Such subscriber level information may be stored in subscription database 24d.

It should be noted that other databases or partitions may make up database 24. For example, database 24 may include one or more databases or partitions for storing information including, but not limited to the following: preferential access information characterizing activity in which content creator 12 engages may refer to data reflecting the type of activity, the level and/or exclusivity of preferential access to that activity granted to consumer 14; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership is contemplated by the disclosure. For example, preferential access need not necessarily be offered for each subscription level. For example, subscriber data may include data reflecting particular content creators to which a subscriber pledges donations.

Figure 4:
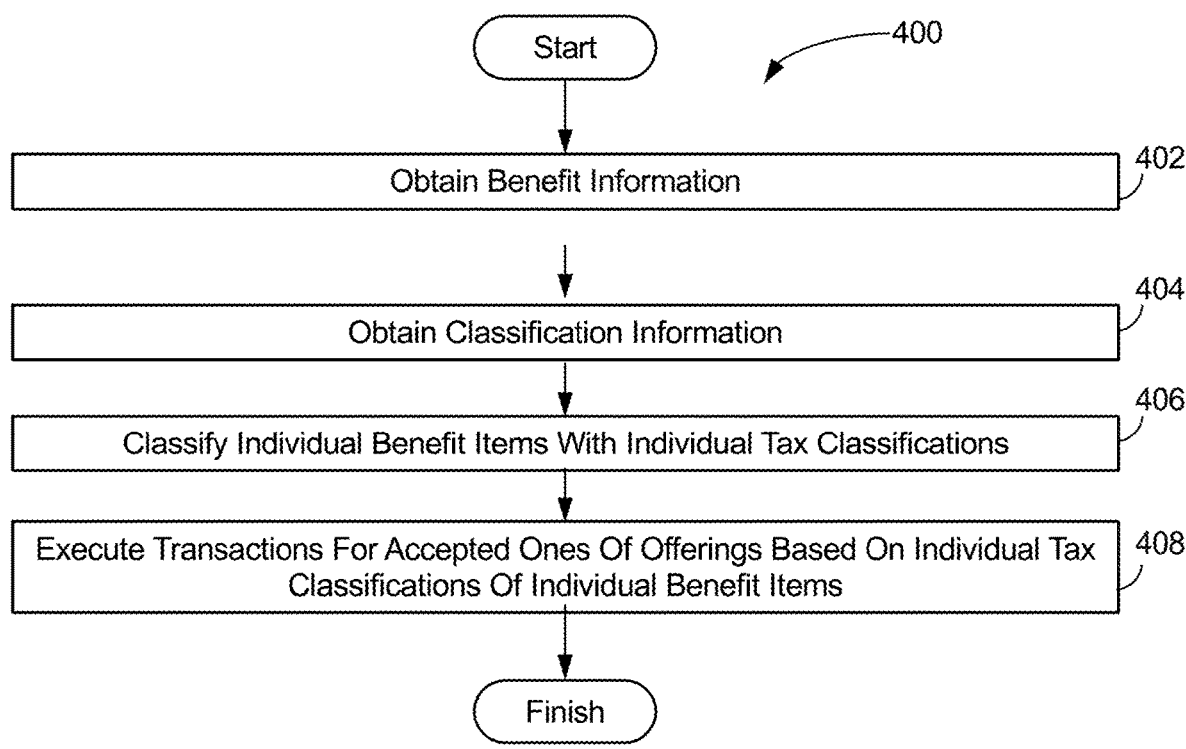
FIG. 4 illustrates a method to determine tax classification of benefits offered to subscribers of a membership platform, in accordance with one or more implementations

FIG. 4 illustrates a method 400 to determine tax classification of benefits offered to subscribers of a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining benefit information and/or other information. Operation 402 may be performed by one or more hardware processors configured by machine-readable instructions including a component that is the same as or similar to benefit management component 108, in accordance with one or more implementations.

An operation 404 may include obtaining classification information and/or other information. Operation 404 may be performed by one or more hardware processors configured by machine-readable instructions including a component that is the same as or similar to classification component 110, in accordance with one or more implementations.

An operation 406 may include classifying individual benefit items with individual tax classifications. Classifying the individual benefit items may be based on the benefit type of the individual benefit items, the classification information, and/or other information. Operation 406 may be performed by one or more hardware processors configured by machine-readable instructions including a component that is the same as or similar to classification component 110, in accordance with one or more implementations.

An operation 408 may include executing transactions for accepted ones of the offerings based on the individual tax classifications of the individual benefit items. Operation 408 may be performed by one or more hardware processors configured by machine-readable instructions including a component that is the same as or similar to transaction component 112, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine tax classification of benefits offered within an online membership platform to subscribers who subscribe to content creators, the system comprising:
   one or more physical processors configured by machine-readable instructions to:
      obtain benefit information for content creators of an online membership platform, the online membership platform hosting the content creators who offer subscribership in exchange for recurring consideration, the benefit information including descriptions of benefit items received by subscribers of the content creators as part of the subscribership, the benefit items being classified by benefit types, the benefit types including an original digital good type, a physical good type, and donation type; and
      classify individual benefit items with individual tax classifications by:
         training a machine learning model based on a set of input/output data pairs to generate a trained machine learning model, individual input data in an individual input/output data pair comprising a description of an individual benefit item, individual output data in the individual input/output data pair comprising an individual benefit type of the individual benefit item and a corresponding tax classification of the individual benefit item;
         determining, using the trained machine learning model, individual benefit types of the individual benefit items; and
         classifying, using the trained machine learning model, the individual benefit items with the individual tax classifications.

2. The system of claim 1, wherein the benefit information describes the benefit items in an unstructured data format, and wherein the one or more physical processors are further configured by the machine-readable instructions to:
   identify the benefit items from the benefit information using an unsupervised machine learning model.

3. The system of claim 1, wherein the one or more physical processors are further configured by the machine-readable instructions to:
   effectuate presentation of a user interface on computing platforms of the content creators, the user interface being configured to obtain entry and/or selection of identification of the individual benefit items offered as part of the subscribership to the content creators.

4. The system of claim 1, wherein the one or more physical processors are further configured by the machine-readable instructions to:
   effectuate presentation of a user interface on computing platforms of the content creators, the user interface being configured to obtain entry and/or selection of the individual benefit types of one or more of the benefit items.

5. The system of claim 1, wherein the one or more physical processors are further configured by the machine-readable instructions to facilitate execution of transactions for accepted subscribership offerings based on the individual tax classifications of the individual benefit items received by the subscribers of the content creators as part of the subscribership to the content creators, wherein the transactions are based on transaction amounts comprising sale amounts and added tax amounts determined based on the individual tax classifications.

6. The system of claim 5, wherein the one or more physical processors are further configured by the machine-readable instructions to:
   obtain purchase information conveying the acceptance of the subscribership by the subscribers, the purchase information specifying the sale amounts; and
   determine the added tax amounts based on the sale amounts and the individual tax classifications.

7. The system of claim 6, wherein facilitating execution of the transactions includes:
   effectuating presentation of a user interface on computing platforms of the subscribers, the user interface displaying the transaction amounts to the subscribers and being configured to obtain entry and/or selection of acceptance of the transaction amounts.

8. The system of claim 7, wherein facilitating execution of the transactions further includes:
   responsive to obtaining the entry and/or selection of the acceptance of the transaction amounts:
   collect the transaction amounts; and
   remit the added tax amounts to an appropriate tax collection entity.

9. The system of claim 5, wherein the added tax amounts are a value-added tax.

10. A computer-implemented method to determine tax classification of benefits offered within an online membership platform to subscribers who subscribe to content creators, the method being implemented in a computer system comprising one or more physical processors configured to execute machine-readable instructions, such that execution of the machine-readable instructions causes the one or more physical processors to perform the method comprising:

obtaining benefit information for content creators of an online membership platform, the online membership platform hosting the content creators who offer subscribership in exchange for recurring consideration, the benefit information including descriptions of benefit items received by subscribers of the content creators as part of the subscribership, the benefit items being classified by benefit types, the benefit types including an original digital good type, a physical good type, and donation type; and classifying individual benefit items with individual tax classifications by:
    training a machine learning model based on a set of input/output data pairs to generate a trained machine learning model, individual input data in an individual input/output data pair comprising a description of an individual benefit item, individual output data in the individual input/output data pair comprising an individual benefit type of the individual benefit item and a corresponding tax classification of the individual benefit item;
    determining, using the trained machine learning model, individual benefit types of the individual benefit items; and
    classifying, using the trained machine learning model, the individual benefit items with the individual tax classifications.

11. The method of claim 10, wherein the benefit information describes the benefit items in an unstructured data format, and wherein the method further comprises identifying the benefit items from the benefit information using an unsupervised machine learning model.

12. The method of claim 10, further comprising:
effectuating presentation of a user interface on computing platforms of the content creators, the user interface being configured to obtain entry and/or selection of identification of the individual benefit items offered as part of the subscribership to the content creators.

13. The method of claim 10, further comprising:
effectuating presentation of a user interface on computing platforms of the content creators, the user interface being configured to obtain entry and/or selection of the individual benefit types of one or more of the benefit items.

14. The method of claim 10, further comprising facilitating execution of transactions for accepted subscribership offerings based on the individual tax classifications of the individual benefit items received by the subscribers of the content creators as part of the subscribership to the content creators, wherein the transactions are based on transaction amounts comprising sale amounts and added tax amounts determined based on the individual tax classifications.

15. The method of claim 14, further comprising:
obtaining purchase information conveying the acceptance of the subscribership by the subscribers, the purchase information specifying the sale amounts; and
determining the added tax amounts based on the sale amounts and the individual tax classifications.

16. The method of claim 15, wherein the facilitating execution of the transactions includes:
effectuating presentation of a user interface on computing platforms of the subscribers, the user interface displaying the transaction amounts to the subscribers and being configured to obtain entry and/or selection of acceptance of the transaction amounts.

17. The method of claim 16, wherein the facilitating execution of the transactions further includes:
responsive to obtaining the entry and/or selection of the acceptance of the transaction amounts:
    collecting the transaction amounts; and
    remitting the added tax amounts to an appropriate tax collection entity.

18. The method of claim 14, wherein the added tax amounts are a value-added tax.

\* \* \* \* \*